(12) United States Patent
Baldwin (10) Patent No.: US 8,177,674 B2
(45) Date of Patent: May 15, 2012

(54) MULTIPLE SPEED AUTOMATIC TRANSMISSION

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 987 days.

(21) Appl. No.: 11/865,097

(22) Filed: Oct. 1, 2007

(65) Prior Publication Data

US 2009/0088289 A1 Apr. 2, 2009

(51) Int. Cl.
*F16H 3/62* (2006.01)
(52) U.S. Cl. .................... 475/275; 475/276; 475/278
(58) Field of Classification Search ............ 475/289, 475/281
See application file for complete search history.

(56) References Cited

U.S. PATENT DOCUMENTS

| | | | |
|---|---|---|---|
| 3,971,267 A | 7/1976 | Murakami et al. | |
| 3,999,448 A | 12/1976 | Murakami et al. | |
| 4,683,776 A | 8/1987 | Klemen | |
| 6,083,135 A * | 7/2000 | Baldwin et al. | 475/276 |
| 6,176,803 B1 | 1/2001 | Meyer et al. | |
| 6,302,820 B1 | 10/2001 | Ried | |
| 6,752,793 B1 | 6/2004 | Dascanio et al. | |
| 6,960,149 B2 | 11/2005 | Ziemer | |
| 6,984,187 B2 | 1/2006 | Biermann | |
| 7,008,347 B2 | 3/2006 | Klemen | |
| 2005/0059525 A1 * | 3/2005 | Tabata et al. | 475/271 |
| 2008/0020890 A1 | 1/2008 | Shim | |
| 2008/0039266 A1 | 2/2008 | Shim | |
| 2008/0039267 A1 | 2/2008 | Shim | |
| 2008/0113844 A1 * | 5/2008 | Baldwin | 475/276 |

FOREIGN PATENT DOCUMENTS

GB 2443720 A 5/2008

* cited by examiner

*Primary Examiner* — David D Le
*Assistant Examiner* — Erin D Bishop
(74) *Attorney, Agent, or Firm* — David B. Kelley; Brooks Kushman, P.C.

(57) ABSTRACT

A multiple speed transmission includes an input and output; a first, second, third and fourth planetary gear sets, each gear set including a sun gear, a ring gear, a carrier, and pinions supported on the carrier and meshing with the sun gear and the ring gear; a first epicyclic gearing assembly including the first gear set, the second gear set, a first clutch, a second clutch, a first brake, and first, second, third and fourth rotating members, said first clutch being operable to couple said first rotating member to the input, said second clutch being operable to couple said second rotating member to the input, and said first brake being operable to hold said fourth rotating member against rotation; and a second epicyclic gearing assembly including the third gear set, the fourth gear set, a third clutch, a second brake, a third brake, and fifth, sixth, seventh and eighth rotating members, the third rotating member being secured to the eighth rotating member, said third clutch being operable to couple said seventh rotating member to the input, said second brake being operable to hold said seventh rotating member against rotation, said third brake being operable to hold said fifth rotating member against rotation, and said sixth rotating member being secured for rotation to the output.

15 Claims, 5 Drawing Sheets

| | | |
|---|---|---|
| beta1 | $N_{22}/N_{28}$ | 1.600 |
| beta2 | $N_{32}/N_{38}$ | 1.600 |
| beta3 | $N_{42}/N_{48}$ | 2.500 |
| beta4 | $N_{52}/N_{58}$ | 2.000 |

FIG. 4

| | L1 60 | L2 62 | Rev 64 | Fwd 66 | High 68 | OD 70 | Low 72 | Speed Ratio | Ratio Step |
|---|---|---|---|---|---|---|---|---|---|
| Low Rev | X | | X | | | | | | |
| R1 | X | X | X | | | CST | X | -4.550 | 1.61 |
| R2 | X | X | X | | | CST | X | -2.827 | 1.62 |
| Low | | X | | X | | | X | -1.750 | |
| 1st | X | X | | X | | CST | X | 5.460 | 1.61 |
| 2nd | X | X | | X | | CST | | 3.392 | 1.62 |
| 3rd | (X) | Alt | | X | X | | | 2.100 | 1.50 |
| 4th | X | X | | | X | | | 1.400 | 1.40 |
| 5th | | X | | | X | X | | 1.000 | 1.22 |
| 6th | X | | | | X | X | | 0.821 | 1.11 |
| | | | | | | | | 0.740 | |

FIG. 5

|  | $N_{22}/N_{28}$ | 1.700 |
|---|---|---|
| beta1 | $N_{32}/N_{38}$ | 1.520 |
| beta2 | $N_{42}/N_{48}$ | 1.520 |
| beta3 | $N_{52}/N_{58}$ | 2.850 |
| beta4 | | |

FIG. 6

|  | L1 | L2 | Rev | Fwd | High | OD | Low | Speed Ratio | Ratio Step |
|---|---|---|---|---|---|---|---|---|---|
|  | 60 | 62 | 64 | 66 | 68 | 70 | 72 | | |
| Low Rev | X | | X | | | | | -3.830 | |
| R1 | | X | X | | | CST | | -2.414 | 1.59 |
| R2 | X | X | X | | | CST | | -1.520 | 1.59 |
| Low | X | | | X | | | X | 4.748 | |
| 1st | | X | | X | | CST | X | 2.993 | 1.59 |
| 2nd | X | X | | X | | CST | X | 1.884 | 1.59 |
| 3rd | (X) | Alt | | | X | | | 1.351 | 1.39 |
| 4th | X | X | | | X | | | 1.000 | 1.35 |
| 5th | | X | | | X | X | | 0.804 | 1.24 |
| 6th | X | | | | X | X | | 0.716 | 1.12 |

FIG. 7

MULTIPLE SPEED AUTOMATIC TRANSMISSION

BACKGROUND OF THE INVENTION

1. Field of the Invention

This invention relates to the field of automatic transmissions for motor vehicles. More particularly, the invention pertains to a kinematic arrangement of gearing, clutches, brakes, and the interconnections among them in a power transmission.

2. Description of the Prior Art

Traditionally, automatic transmissions have a planetary gearbox which provides a finite collection of selectable speed ratios and a torque converter which allows the engine to rotate even when the vehicle is stopped. The gearbox must provide a sufficiently low speed ratio to provide high output torque at low vehicle speed, a sufficiently high top gear ratio to minimize fuel consumption at highway speed, and enough speed ratios in between to enable comfortable shifts. The gearbox must also provide at least one negative speed ratio so that the vehicle can propel itself in reverse.

The primary function of the torque converter is to enable the transition from stationary to moving. A hydrodynamic torque converter transmits power from the engine to the gearbox input shaft whenever the engine speed exceeds the speed of the input shaft. When the gearbox input speed is zero, the torque applied to the gearbox is a multiple of the torque supplied by the engine. This torque ratio decreases as the vehicle accelerates and the speeds become more nearly equal. A substantial amount of the power supplied by the engine is dissipated by the torque converter whenever there is relative speed between the engine and the input shaft. Therefore, modern transmissions include a converter bypass clutch which is engaged at higher vehicle speeds to avoid this energy loss.

It is desirable to replace the torque converter with a launch clutch. This reduces fuel consumption in two ways. First, a torque converter will dissipate energy through slip until the bypass clutch is locked, whereas a launch clutch will be fully engaged at a low vehicle speed. Second, the clutch can be set at zero torque capacity when the vehicle is at rest, whereas a torque converter always places some load on the engine.

Launching a vehicle with a clutch presents several technical challenges. First, a slipping clutch does not multiply the torque as a torque converter does. Second, a clutch is not nearly as effective as a torque converter at dissipating heat. Both of these problems are most effectively addressed by providing lower gear ratios within the gearbox. This reduces the heat associated with a launch by reducing the input torque necessary to achieve a desired output torque and by reducing the time before the clutch is completely engaged. Finally, even when a clutch is disengaged, there is some parasitic drag. This drag tends to be higher for launch clutches than other clutches because the design is optimized for energy dissipation as opposed to drag reduction. If there is a high relative speed across a launch clutch in the higher gears, then this parasitic drag will have a large impact on fuel economy.

Although a lower gear ratio addresses some of the challenges, there are functional compromises associated with an extremely low gear ratio. When the vehicle is lightly loaded, it accelerates quickly. Once the launch is complete, the extreme gear ratio forces the engine to accelerate proportionately faster. The noise that results is considered unpleasant by many drivers and occupants. Also, the first shift occurs at a very low vehicle speed, which many drivers dislike.

Dual clutch transmissions are a class of automatic transmissions that use a blend of traditional automatic transmission components and manual transmission components. Essentially, a dual clutch transmission is a pair of automated manual transmissions; one for even gears and one for odd gears. Shifts between even and odd gears can be performed without torque interruption. Dual clutch transmissions do not typically have torque converters. At least one of the clutches, which can be either a wet or dry clutch, is used as the launch clutch and the advantages mentioned previously are realized. In addition to the functional compromises mentioned previously, these transmissions have other drawbacks relative to a planetary automatic. First, they typically use layshaft gearing, which is less efficient than planetary gearing for most ratios. Second, they are not able to perform two step shifts directly without torque interruption. For example, a shift from fifth to third would need to briefly engage fourth. This makes the vehicle seem less responsive to the driver.

SUMMARY OF THE INVENTION

The transmission of this invention is a planetary gearbox which provides seven forward speed ratios and three reverse speed ratios. The values for those speed ratios and the application pattern for the clutches is optimized for elimination of the torque converter. Two of the clutches are designated as launch clutches. When the remaining clutches are disposed to prepare for a launch, the vehicle can be launched with a very low speed ratio by engaging the first launch clutch or with a more moderate ratio by engaging the second launch clutch. A sophisticated control strategy determines to what extent each clutch is engaged in order to realize the heat dissipation advantages of the lowest gear ratio while avoiding the aforementioned unpleasant characteristics. Furthermore, the launch clutches are either engaged or open with a low relative speed in the higher gears which minimizes the impact on fuel economy.

A multiple speed transmission includes an input and output; first, second, third and fourth planetary gear sets, each gear set including a sun gear, a ring gear, a carrier, and pinions supported on the carrier and meshing with the sun gear and the ring gear; a first epicyclic gearing assembly including the first gear set, the second gear set, a first clutch, a second clutch, a first brake, and first, second, third and fourth rotating members, said first clutch being operable to couple said first rotating member to the input, said second clutch being operable to couple said second rotating member to the input, and said first brake being operable to hold said fourth rotating member against rotation; and a second epicyclic gearing assembly including the third gear set, the fourth gear set, a third clutch, a second brake, a third brake, and fifth, sixth, seventh and eighth rotating members, the third rotating member being secured to the eighth rotating member, said third clutch being operable to couple said seventh rotating member to the input, said second brake being operable to hold said seventh rotating member against rotation, said third brake being operable to hold said fifth rotating member against rotation, and said sixth rotating member being secured for rotation to the output.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
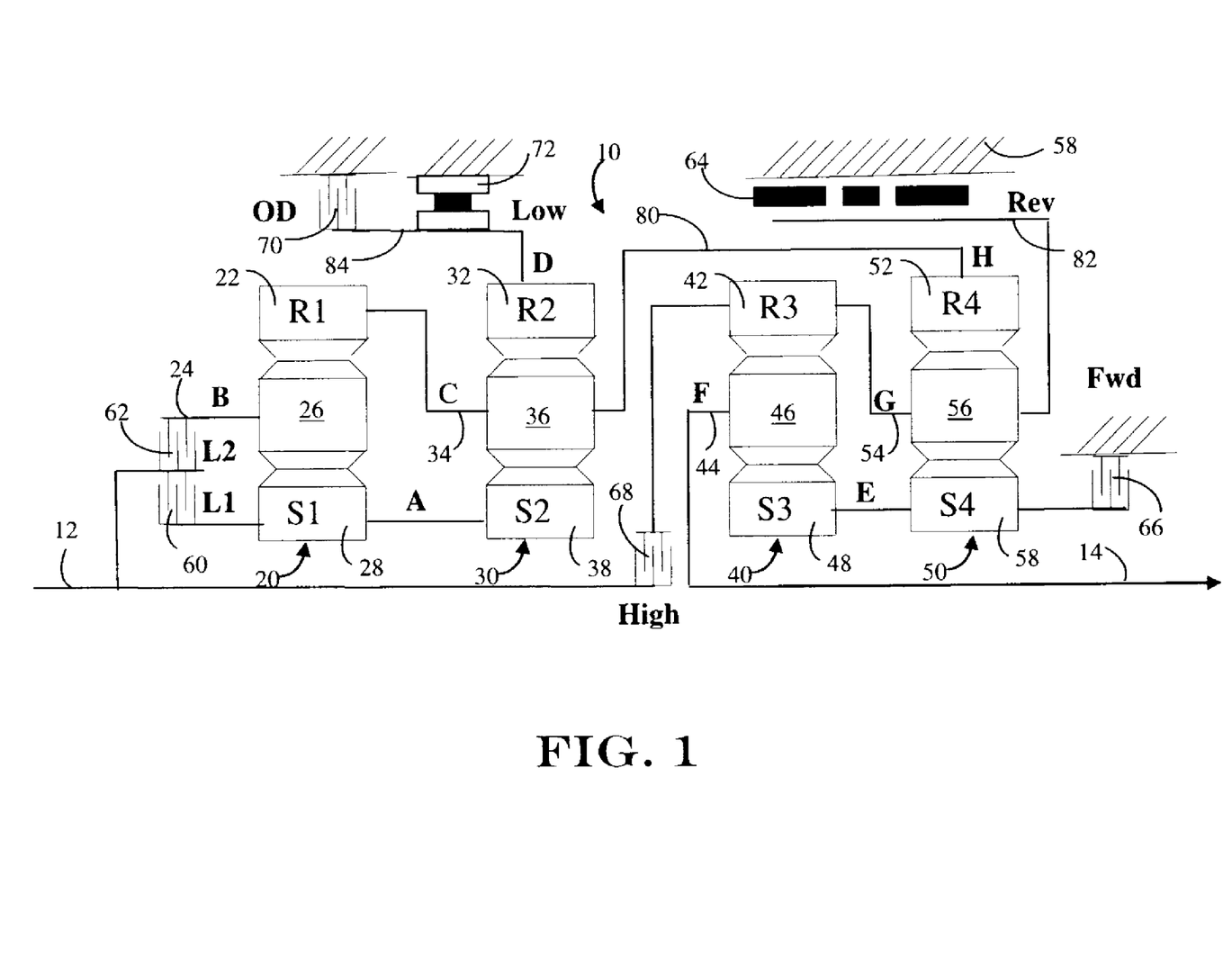
FIG. 1 is a schematic diagram illustrating the kinematic arrangement of a transmission that incorporates planetary gear sets.

Referring now to the drawings, there is illustrated in FIG. 1 the kinematic arrangement of an automatic transmission 10. The transmission includes an input shaft 12 which is driven by an engine or electric motor, possibly via a torsion isolator. Although no torque converter is illustrated, a torque converter could be inserted between the engine or electric motor and input shaft 12. The transmission also includes an output shaft 14 which is connected to the vehicle driving wheels via a differential mechanism and an axle.

A planetary gear system includes first, second, third, and fourth gear sets 20, 30, 40, and 50. The first gear set 20 includes a sun gear 28, ring gear 22, carrier 24, and planet pinions 26 supported on carrier 24 and meshing with sun gear 28 and ring gear 22. Similarly, the second gear set 30 includes a sun gear 38, ring gear 32, carrier 34, and planet pinions 36 supported on carrier 34 and meshing with sun gear 38 and ring gear 32. The third gear set 40 includes a sun gear 48, ring gear 42, carrier 44, and planet pinions 46 supported on carrier 44 and meshing with sun gear 48 and ring gear 42. The fourth gear set 50 includes a sun gear 58, ring gear 52, carrier 54, and planet pinions 56 supported on carrier 54 and meshing with sun gear 58 and ring gear 52.

Sun gear 28 is secured to sun gear 38 for rotation as a unit. Ring gear 22 and carrier 34 are mutually driveably connected and are secured by drum 80 to ring gear 52 for rotation as a unit. Ring gear 32 is secured to drum 84 for rotation as a unit. Ring gear 42 and carrier 54 are mutually driveably connected and are secured to drum 82 for rotation as a unit. Sun gear 48 is secured to sun gear 58 for rotation as a unit. Carrier 44 is secured to the output 14.

Input 12 is alternately driveably connected to and disconnected from sun gear 28 and sun gear 38 by launch clutch 60 (L1). Input 12 is alternately driveably connected to and disconnected from carrier 24 by launch clutch 62 (L2). Input 12 is alternately driveably connected to and disconnected from ring gear 42 by clutch 68 (High). Ring gear 32 is alternately held against rotation, preferably on the transmission case 58, upon engagement of a brake 70 (OD) and is released for free rotation upon disengagement of brake 70. Ring gear 42 and carrier 54 are alternately held against rotation, preferably on the transmission case 58, upon engagement of a band brake 64 (Rev) and are released for free rotation upon disengagement of band brake 64. Sun gear 48 and sun gear 58 are alternately held against rotation, preferably on the transmission case 58, upon engagement of a brake 66 (Fwd) and are released for free rotation upon disengagement of brake 66. A one-way brake 72 (Low) alternately holds ring gear 32 against rotation on the transmission case 58 in one rotary direction and releases it to rotate freely in the opposite direction.

Clutches 60, 62, 68 and brakes 66, 70 are preferably hydraulically-actuated control devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units to which the elements of the clutch or brake are secured. When the pressure is vented from the servo cylinder, the clutch or brake is disengaged and the components are free to rotate independently. Preferably band brake 64 is actuated to engage drum 82 in response to the magnitude of hydraulic pressure in the cylinder of a servo. A unique feature of this transmission is the fact that band brake 64, which provides the torque reaction in reverse, is never involved in any dynamic shift events. Therefore, it is feasible to use a clutch mechanism with very low parasitic drag which would typically be rejected based on poor controllability. This is important because this clutch must have a very high torque capacity and a traditional clutch would contribute excessive drag in high gears and adversely impact fuel economy.

One-way brake 72 may be actuated by a sprag, roller, rocker or a similar device in response to the rotary direction of drum 84 relative to housing 58. Although the one-way brake 72 is operative to produce a non-synchronous 1-2 upshift and to reduce open brake viscous drag, brake 72 can be deleted and its function replaced by brake 70.

Figure 2:
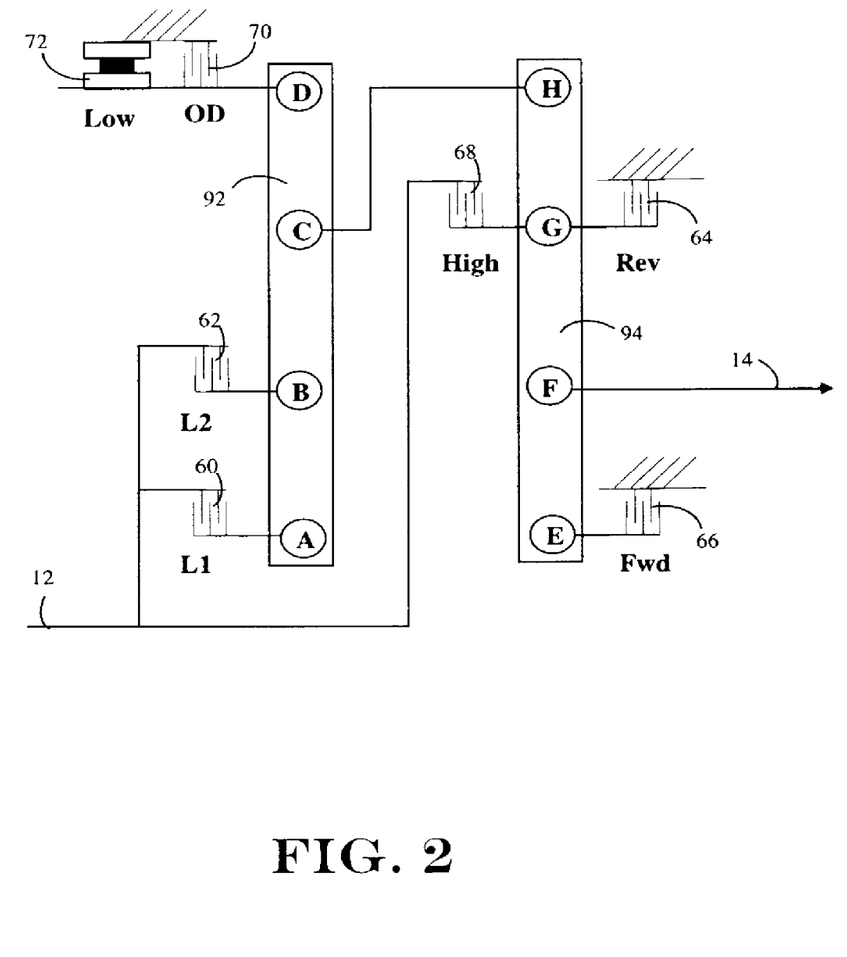
FIG. 2 is a schematic lever diagram representing interconnections among components of the transmission of FIG. 1.

FIG. 2 is a lever diagram having two levers 92, 94 and representing transmission 10. On the first lever 92, which corresponds to gear sets 20 and 30, node A, a first rotating member A, represents sun gear 28 and sun gear 38; node B, a second rotating member B, represents carrier 24; node C, a third rotating member C, represents ring gear 22 and carrier 34; and node D, a fourth rotating member D, represents ring gear 32. A torsional reaction is produced by brake 70 and one-way brake 72 at rotating member D.

On the second lever 94, which corresponds to gear sets 40 and 50, node E, a fifth rotating member E, represents sun gear 48 and sun gear 58; node F, a sixth rotating member F, represents carrier 44 and output 14; node G, a seventh rotating member G, represents ring gear 42 and carrier 54; and node H, an eighth rotating member H, represents ring gear 52. A torsional reaction is produced by brake 66 at node E. A torsional reaction is produced by brake 64 at node G.

Input 12 is connected by launch clutch 60 to rotating member A, by launch clutch 62 to rotating member B, and by clutch 68 to rotating member G. Rotating members C and H are continually mutually interconnected.

Figure 3:
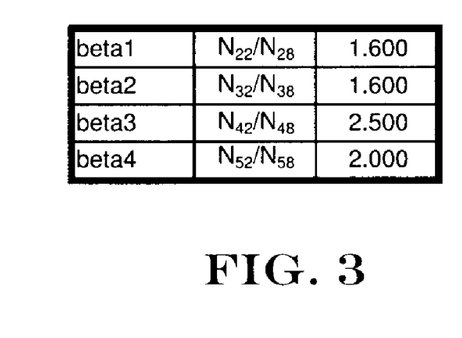
FIG. 3 is a chart showing preferred beta ratios for each gear set of the transmission of FIG. 1.
Figure 4:
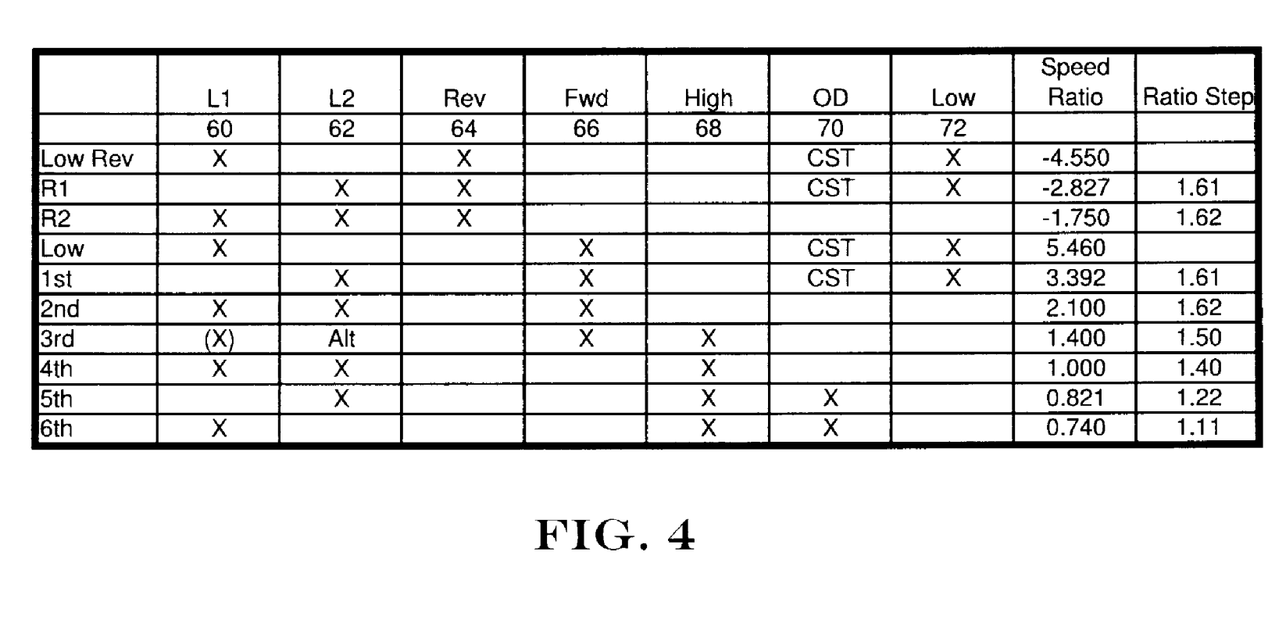
FIG. 4 is a chart showing for each forward and reverse speed ratio the operating state of the clutches and brakes that control the transmission of FIG. 1 and the resulting speed ratio when the gear sets have the beta ratios shown in FIG. 3.

Operation of the transmission 10 is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 4 is a chart indicating the state of engagement and disengagement of the clutches and brakes corresponding to each of the gears. In the chart, symbol "X" indicates an engaged clutch or brake that is engaged to produce the respective gear, "(X)" indicates a clutch or brake that may be engaged, but does not affect operation in the respective gear, and "Alt" indicates a clutch or brake that may be engaged alternately instead of the clutch or brake marked "(X)" for the respective gear. A blank indicates that the corresponding clutch and brake is disengaged or released. In low forward and reverse gears, the "X" for one-way brake 72 indicates that the brake is producing a drive connection to the housing 58 and is not overrunning. "CST" in those gears for brake 70 indicates that brake 70 must be engaged if it is desired to transmit torque in the negative direction such that the engine provides a braking action while coasting. FIG. 4 also shows the speed ratio for each forward and reverse gear when the gear sets have the beta ratios illustrated in FIG. 3. The speed ratio of a transmission is the ratio of the speed of its input to the speed of its output.

The transmission 10 is prepared for a launch in the forward direction when brake 66 is engaged and all other friction elements are disengaged. In order to launch the vehicle using the low gear ratio, launch clutch 60 is gradually engaged. One-way brake 72 (or brake 70) provides a torque reaction at ring gear 32 and carrier 34 is underdriven. Carrier 34 drives ring gear 52 through drum 80. Brake 66 provides a torque reaction at sun gear 58 and carrier 54 is further underdriven. Carrier 54 drives ring gear 42. Brake 66 provides a torque reaction at sun gear 48, driving carrier 44 and output 14 at an even lower speed.

A transition from low gear ratio to $1^{st}$ gear ratio is accomplished by gradually releasing clutch 60, gradually engaging clutch 62, and maintaining brake 66 engaged. Typically, this transition would be completed before clutch 60 becomes fully engaged. As such, the launch is completed in $1^{st}$ gear, avoiding the unpleasant engine noise and early shift. However, if the vehicle is accelerating slowly, the energy which must be dissipated in the launch clutches may be minimized by completing the launch in low gear. In the later case, the transition to $1^{st}$ gear would be performed as a regular shift after the vehicle reaches sufficient speed to fully engage clutch 62 promptly.

A shift from $1^{st}$ gear to $2^{nd}$ gear is accomplished by gradually engaging clutch 60 while maintaining clutch 62 and brake 66 engaged. This causes all elements of the first and second gear sets to rotate at the speed of the input. One-way brake 72 overruns. The third and fourth gear sets provide torque multiplication in the same fashion as for low and $1^{st}$.

A shift from $2^{nd}$ gear to $3^{rd}$ gear is accomplished by gradually engaging clutch 68, gradually releasing clutch 62, and maintaining clutch 60 and brake 66 engaged. Alternatively, clutch 60 may be gradually released and clutch 62 maintained engaged. In $3^{rd}$ gear, the third gear set provides all of the torque multiplication. Neither clutch 60 nor 62 carries any torque in $3^{rd}$ gear, so both could be released once the shift is complete. However, it is advisable to keep one engaged such that all speeds are determined.

A shift from $3^{rd}$ gear to $4^{th}$ gear is accomplished by gradually engaging clutch 62, gradually releasing brake 66, and maintaining clutch 60. This produces a direct drive state in which all planetary elements rotate with the input.

A shift from $4^{th}$ gear to $5^{th}$ gear is accomplished by gradually engaging brake 70, gradually releasing clutch 60, and maintaining clutch 62 and clutch 68 engaged.

A shift from $5^{th}$ gear to $6^{th}$ gear is accomplished by gradually engaging clutch 60, gradually releasing clutch 62, and maintaining clutch 68 and brake 70 engaged.

The transmission 10 is prepared for a launch in the reverse direction when brake 64 is engaged and all other friction elements are disengaged. In order to launch the vehicle using the low reverse gear ratio, launch clutch 60 is gradually engaged. One-way brake 72 (or brake 70) provides a torque reaction at ring gear 32 and carrier 34 is underdriven in the forward direction. Carrier 34 drives ring gear 52 through drum 80. Brake 64 provides a torque reaction at carrier 54 and sun gear 58 is driven in the reverse direction. Sun gear 58 drives sun gear 48. Brake 64 provides a torque reaction at ring gear 42, driving carrier 44 and output 14 at a lower speed in the reverse direction of input.

A transition from low reverse gear ratio to R1 reverse gear ratio is accomplished by gradually releasing clutch 60, gradually engaging clutch 62, and maintaining brake 64 engaged. As with a forward launch, this transition could be completed before clutch 60 becomes fully engaged to avoid an early shift. However, if the vehicle is accelerating slowly, the energy which must be dissipated in the launch clutches may be minimized by completing the launch in low reverse gear and performing a shift to R1 later.

A shift from R1 reverse gear to R2 reverse gear is accomplished by gradually engaging clutch 60 while maintaining clutch 62 and brake 64 engaged. This causes all elements of the first and second gear sets to rotate at the speed of the input. One-way brake 72 overruns. The third and fourth gear sets provide torque multiplication in the same fashion as for low reverse and R1.

Figure 5:
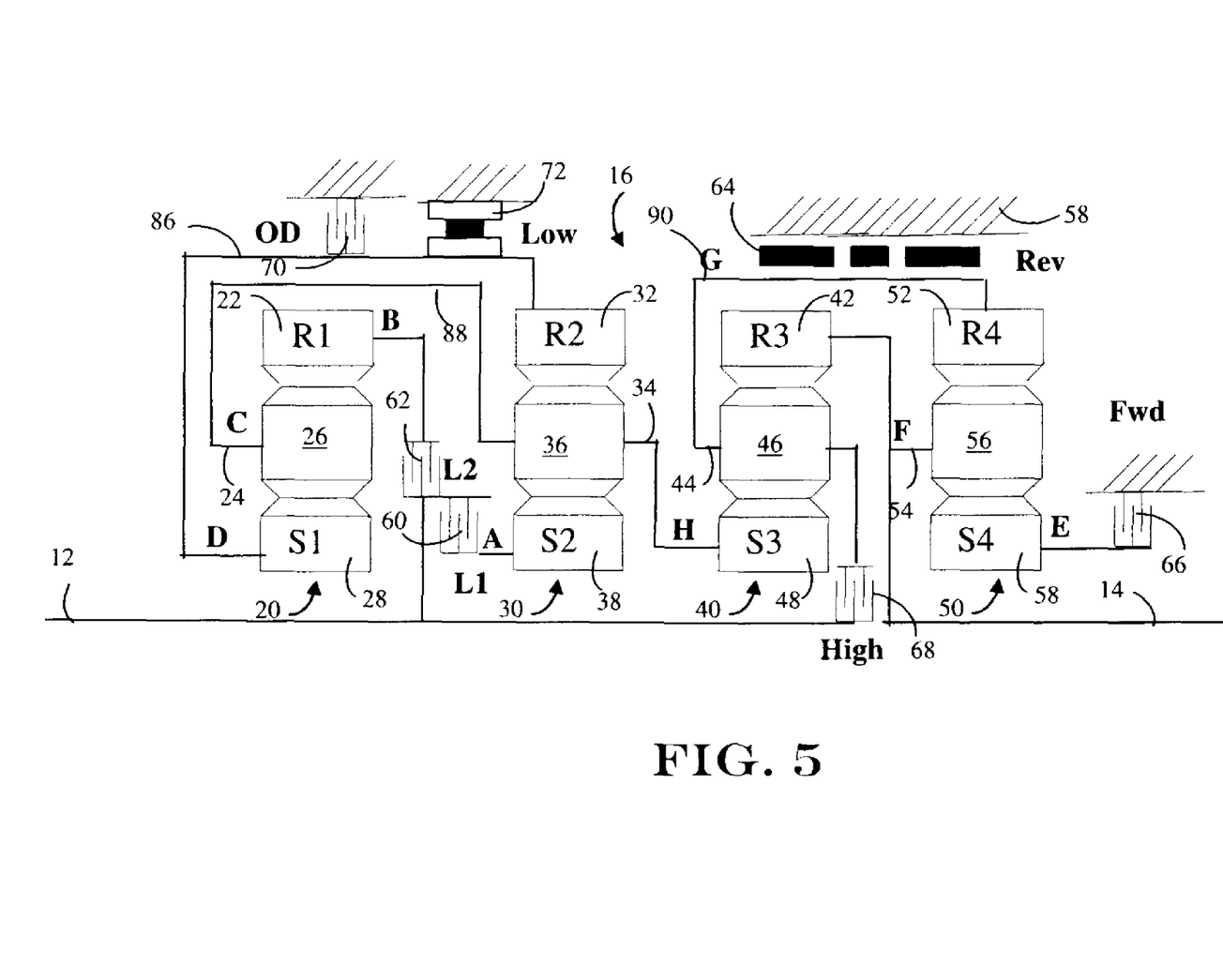
FIG. 5 is a schematic diagram illustrating a second embodiment of a transmission that incorporates planetary gear sets.

FIG. 5 illustrates an alternate kinematic arrangement of an automatic transmission 16 than the arrangement of FIG. 1 and is represented by the same lever diagram of FIG. 2. The transmission includes an input shaft 12 which is driven by an engine or electric motor, possibly via a torsion isolator. Although no torque converter is illustrated, a torque converter could be inserted between the engine or electric motor and input shaft 12. The transmission also includes an output shaft 14 which is connected to the vehicle driving wheels via a differential mechanism and an axle.

A planetary gear system includes first, second, third, and fourth gear sets 20, 30, 40, and 50. The first gear set 20 includes a sun gear 28, ring gear 22, carrier 24, and planet pinions 26 supported on carrier 24 and meshing with sun gear 28 and ring gear 22. Similarly, the second gear set 30 includes a sun gear 38, ring gear 32, carrier 34, and planet pinions 36 supported on carrier 34 and meshing with sun gear 38 and ring gear 32. The third gear set 40 includes a sun gear 48, ring gear 42, carrier 44, and planet pinions 46 supported on carrier 44 and meshing with sun gear 48 and ring gear 42. The fourth gear set 50 includes a sun gear 58, ring gear 52, carrier 54, and planet pinions 56 supported on carrier 54 and meshing with sun gear 58 and ring gear 52.

Sun gear 28 is secured by drum 86 to ring gear 32 for rotation as a unit. Carrier 34 and sun gear 48 are mutually driveably connected and are secured by drum 88 to carrier 24 for rotation as a unit. Carrier 44 is secured by drum 90 to ring gear 52 for rotation as a unit. Ring gear 42 and carrier 54 are mutually driveably connected and are secured to the output 14.

Input 12 is alternately driveably connected to and disconnected from sun gear 38 by launch clutch 60 (L1). Input 12 is alternately driveably connected to and disconnected from ring gear 22 by launch clutch 62 (L2). Input 12 is alternately driveably connected to and disconnected from carrier 44 and ring gear 52 by clutch 68 (High). Drum 86, sun gear 28, and ring gear 32 are alternately held against rotation, preferably on the transmission case 58, upon engagement of a brake 70 (OD) and is released for free rotation upon disengagement of brake 70. Drum 90, carrier 44, and ring gear 22 are alternately held against rotation, preferably on the transmission case 58, upon engagement of a band brake 64 (Rev) and are released for free rotation upon disengagement of band brake 64. Sun gear 58 is alternately held against rotation, preferably on the transmission case 58, upon engagement of a brake 66 (Fwd) and are released for free rotation upon disengagement of brake 66. A one-way brake 72 (Low) alternately holds drum 86, sun gear 28, and ring gear 32 against rotation on the transmission case 58 in one rotary direction and releases them to rotate freely in the opposite direction. Although the one-way brake 72 is operative to produce a non-synchronous 1-2 upshift and to reduce open brake viscous drag, brake 72 can be deleted and its function replaced by brake 70.

The lever diagram of FIG. 2 applies also to transmission 16 of FIG. 5. On the first lever 92, which corresponds to gear sets 20 and 30, node A, a first rotating member A, represents sun gear 38; node B, a second rotating member B, represents ring gear 22; node C, a third rotating member C, represents carrier 24 and carrier 34; and node D, a fourth rotating member D, represents sun gear 28 and ring gear 32. A torsional reaction is produced by brake 70 and one-way brake 72 at rotating member D.

On the second lever 94, which corresponds to gear sets 40 and 50, node E, a fifth rotating member E, represents sun gear 58; node F, a sixth rotating member F, represents ring gear 42, carrier 54, and output 14; node G, a seventh rotating member G, represents carrier 44 and ring gear 52; and node H, an eighth rotating member H, represents sun gear 48. A torsional reaction is produced by brake 66 at node E. A torsional reaction is produced by brake 64 at node G.

Input 12 is connected by launch clutch 60 to rotating member A, by launch clutch 62 to rotating member B, and by clutch 68 to rotating member G. Rotating members C and H are continually mutually interconnected.

Figures 6, 7:
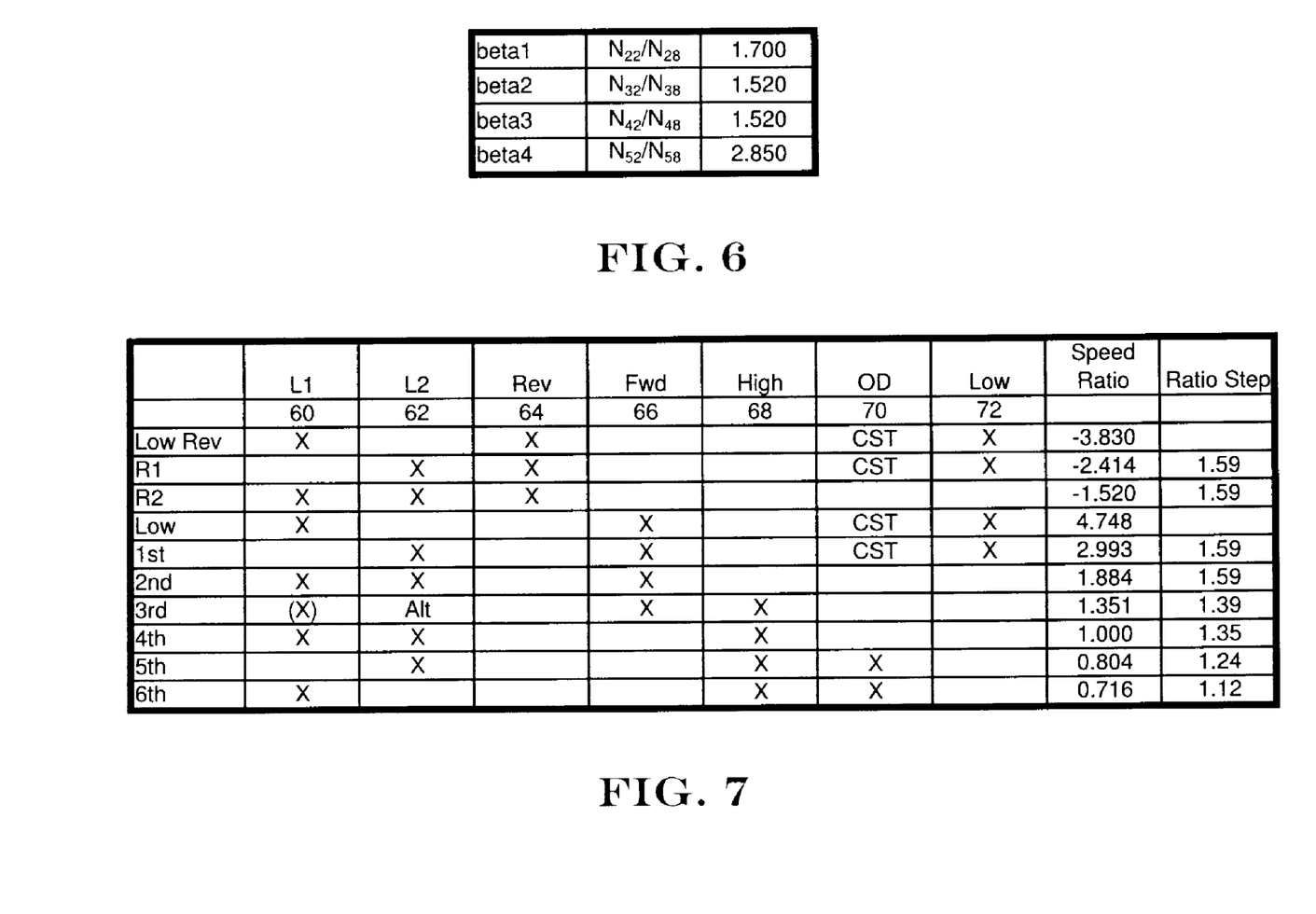
FIG. 6 is a chart showing preferred beta ratios for each gear set of the transmission of FIG. 5.
FIG. 7 is a chart showing for each forward and reverse speed ratio the operating state of the clutches and brakes that control the transmission of FIG. 5 and the resulting speed ratio when the gear sets have the beta ratios shown in FIG. 6.

FIG. 7 is a chart indicating the state of engagement and disengagement of the clutches and brakes corresponding to each of the gears. In the chart, symbol "X" indicates an engaged clutch or brake that is engaged to produce the respective gear, "(X)" indicates a clutch or brake that may be engaged, but does not affect operation in the respective gear, and "Alt" indicates a clutch or brake that may be engaged alternately instead of the clutch or brake marked "(X)" for the respective gear. A blank indicates that the corresponding clutch and brake is disengaged or released. In low forward and reverse gears, the "X" for one-way brake 72 indicates that the brake is producing a drive connection to the housing 58 and is not overrunning. "CST" in those gears for brake 70 indicates that brake 70 must be engaged if it is desired to transmit torque in the negative direction such that the engine provides a braking action while coasting. FIG. 7 also shows the speed ratio for each forward and reverse gear when the gear sets have the beta ratios shown in FIG. 6. The speed ratio of a transmission is the ratio of the speed of its input to the speed of its output.

Transmission 16 operates in seven forward gears and three reverse gears when the clutches and brakes have the states of engagement and disengagement shown in FIG. 7, which are identical to those of FIG. 4. The speed ratios produced in each gear are shown also in FIG. 7, provided A, the ratio of the number of gear teeth of the ring gear to the number of gear teeth of the sun gear for the respective gear sets 20, 30, 40, and 50 is as set forth in FIG. 6.

A transmission embodiment according to this invention may contain two epicyclic gearing assemblies, each with four members that rotate around a common axis. In each epicyclic gearing assembly, two of the rotating elements have the most extreme speeds at all times, while the speeds of the other two elements are a weighted average of those two speeds. The weighting factors are determined by the configuration of the epicyclic gearing assembly and the ratios of the numbers of gear teeth. These epicyclic gearing assemblies are represented by levers in FIG. 2. The nodes on the endpoints of the levers (A, D, E, and H) represent the elements that have the most extreme speeds, while the interior nodes (B, C, F, and G) represent the nodes whose speeds are a weighted average of the former group.

There are many possible configurations of epicyclic gearing assemblies that will produce any particular desired weighting factors. Two such configurations have been illustrated here for each of the two epicyclic gearing assemblies. It should be noted that other known configurations of epicyclic gearing assemblies, which achieve the same or similar weighting factors can be substituted for those illustrated without departing from the spirit of this invention. Specifically, in some configurations, the planetary gear sets contain two sets of pinion gears instead of one, with an inner set meshing with the sun gear, the outer set meshing with the ring gear, and the two sets meshing with each other. In other configurations, such as a Ravigneaux arrangement, some of the pinion gears are shared between multiple gear sets.

In accordance with the provisions of the patent statutes, the preferred embodiment has been described. However, it should be noted that the alternate embodiments can be practiced otherwise than as specifically illustrated and described.

What is claimed is:

1. A multiple speed transmission for automotive vehicles, comprising:
   an input and an output configured to rotate about a transmission axis;
   a first epicyclic gearing assembly including a first clutch, a second clutch, a first brake, and first, second, third and fourth rotating members, said first through fourth rotating members configured to rotate about the transmission axis at first through fourth speeds respectively, said first through fourth speeds distinct with respect to one another in at least some operating condition, said first clutch being operable to couple said first rotating member to the input, said second clutch being operable to couple said second rotating member to the input, and said first brake being operable to hold said fourth rotating member against rotation; and
   a second epicyclic gearing assembly including a second brake, a third brake, a third clutch, and fifth, sixth, seventh and eighth rotating members, said fifth through eighth rotating members configured to rotate about the transmission axis, the third rotating member being continuously secured to the eighth rotating member, said second brake being operable to hold said seventh rotating member against rotation, said third brake being operable to hold said fifth rotating member against rotation, said third clutch being operable to couple the seventh rotating member to the input, and said sixth rotating member being secured for rotation to the output.

2. The transmission of claim 1, wherein:
the transmission produces six forward gears by selective operation of the first, second, and third clutches and the first and third brakes,
the second clutch, first brake, and third brake being engaged to produce a first forward gear,
the first clutch, second clutch, and third brake being engaged to produce a second forward gear,
the third clutch and third brake being engaged to produce a third forward gear,
the first clutch, second clutch, and third clutch being engaged to produce a fourth forward gear,
the second clutch, third clutch, and first brake being engaged to produce a fifth forward gear, and
the first clutch, third clutch, and first brake being engaged to produce a sixth forward gear.

3. The transmission of claim 2, wherein:
the transmission produces a seventh forward gear by selective operation of the first clutch and the first and third brakes.

4. The transmission of claim 1, wherein:
the transmission produces three reverse gears by selective operation of the first and second clutches and the first and second brakes,
the first clutch, first brake, and second brake being engaged to produce a first reverse gear,
the second clutch, first brake, and second brake being engaged to produce a second reverse gear, and
the first clutch, second clutch, and second brake being engaged to produce a third reverse gear.

5. The transmission of claim 1, further comprising a one-way brake which restrains the fourth rotating member against rotation in the negative direction while permitting rotation in the positive direction.

6. The transmission of claim 5, wherein:
the transmission produces seven forward gears by selective operation of the first, second, and third clutches and the first and third brakes,
the second clutch and third brake being engaged to produce a first forward gear,
the first clutch, second clutch, and third brake being engaged to produce a second forward gear,
the third clutch and third brake being engaged to produce a third forward gear,
the first clutch, second clutch, and third clutch being engaged to produce a fourth forward gear,
the second clutch, third clutch, and first brake being engaged to produce a fifth forward gear,
the first clutch, third clutch, and first brake being engaged to produce a sixth forward gear, and
the first clutch and third brake being engaged to produce a seventh forward gear.

7. The transmission of claim 5, wherein:
the transmission produces three reverse gears by selective operation of the first and second clutches and the second brake,
the first clutch and second brake being engaged to produce a first reverse gear,
the second clutch and second brake being engaged to produce a second reverse gear, and
the first clutch, second clutch, and second brake being engaged to produce a third reverse gear.

8. The transmission of claim 1, wherein:
the first epicyclic gearing assembly comprises first and second planetary gear sets, each gear set including a sun gear, a ring gear, a carrier, and pinions supported on the carrier and meshing with the sun gear and ring gear,
the first rotating member includes the sun gear of the first gear set and the sun gear of the second gear set,
the second rotating member includes the carrier of the first gear set,
the third rotating member includes the ring gear of the first gear set and the carrier of the second gear set, and
the fourth rotating member includes the ring gear of the second gear set.

9. The transmission of claim 1, wherein:
the first epicyclic gearing assembly comprises first and second planetary gear sets, each gear set including a sun gear, a ring gear, a carrier, and pinions supported on the carrier and meshing with the sun gear and ring gear,
the first rotating member includes the sun gear of the second gear set,
the second rotating member includes the ring gear of the first gear set,
the third rotating member includes the carrier of the first gear set and the carrier of the second gear set, and
the fourth rotating member includes the sun gear of the first gear set and the ring gear of the second gear set.

10. The transmission of claim 1, wherein:
the second epicyclic gearing assembly comprises third and fourth planetary gear sets, each gear set including a sun gear, a ring gear, a carrier, and pinions supported on the carrier and meshing with the sun gear and ring gear,
the fifth rotating member includes the sun gear of the third gear set and the sun gear of the fourth gear set,
the sixth rotating member includes the carrier of the third gear set,
the seventh rotating member includes the ring gear of the third gear set and the carrier of the fourth gear set, and
the eighth rotating member includes the ring gear of the fourth gear set.

11. The transmission of claim 1, wherein:
the second epicyclic gearing assembly comprises third and fourth planetary gear sets, each gear set including a sun gear, a ring gear, a carrier, and pinions supported on the carrier and meshing with the sun gear and ring gear,
the fifth rotating member includes the sun gear of the fourth gear set,
the sixth rotating member includes the ring gear of the third gear set and the carrier gear of the fourth gear set,
the seventh rotating member includes the carrier of the third gear set and the ring gear of the fourth gear set, and
the eighth rotating member includes the sun gear of the third gear set.

12. The transmission of claim 1, wherein:
the first epicyclic gearing assembly comprises first and second planetary gear sets, each gear set including a sun gear, a ring gear, a carrier, and pinions supported on the carrier and meshing with the sun gear and ring gear,
the second epicyclic gearing assembly comprises third and fourth planetary gear sets, each gear set including a sun gear, a ring gear, a carrier, and pinions supported on the carrier and meshing with the sun gear and ring gear,
the first rotating member includes the sun gear of the first gear set and the sun gear of the second gear set,
the second rotating member includes the carrier of the first gear set,
the third rotating member includes the ring gear of the first gear set and the carrier of the second gear set,
the fourth rotating member includes the ring gear of the second gear set, the fifth rotating member includes the sun gear of the third gear set and the sun gear of the fourth gear set, the sixth rotating member includes the carrier of the third gear set, the seventh rotating member includes the ring gear of the third gear set and the carrier of the fourth gear set, and the eighth rotating member includes the ring gear of the fourth gear set.

13. The transmission of claim 1, wherein:

the first epicyclic gearing assembly comprises first and second planetary gear sets, each gear set including a sun gear, a ring gear, a carrier, and pinions supported on the carrier and meshing with the sun gear and ring gear, the second epicyclic gearing assembly comprises third and fourth planetary gear sets, each gear set including a sun gear, a ring gear, a carrier, and pinions supported on the carrier and meshing with the sun gear and ring gear, the first rotating member includes the sun gear of the second gear set, the second rotating member includes the ring gear of the first gear set, the third rotating member includes the carrier of the first gear set and the carrier of the second gear set, the fourth rotating member includes the sun gear of the first gear set and the ring gear of the second gear set, the fifth rotating member includes the sun gear of the fourth gear set, the sixth rotating member includes the ring gear of the third gear set and the carrier gear of the fourth gear set, the seventh rotating member includes the carrier of the third gear set and the ring gear of the fourth gear set, and the eighth rotating member includes the sun gear of the third gear set.

14. A multiple speed transmission for automotive vehicles, comprising:

an input and an output;

a first, second, third and fourth planetary gear sets, each gear set including a sun gear, a ring gear, a carrier, and pinions supported on the carrier and meshing with the sun gear and the ring gear;

the sun gear of the first gear set being secured to the sun gear of the second gear set;

the ring gear of the first gear set, the carrier of the second gear set and the ring gear of the fourth gear set being secured mutually;

the sun gear of the third gear set being secured to the sun gear of the fourth gear set;

the ring gear of the third gear set being secured to the carrier of the fourth gear set;

the output being secured to the carrier of the third gear set;

a first clutch for alternately driveably connecting and disconnecting the input to the sun gear of the first gear set and sun gear of the second gear set;

a second clutch for alternately driveably connecting and disconnecting the input to the carrier of the first gear set;

a third clutch for alternately driveably disconnecting and connecting the input to the ring gear of the third gear set and the carrier of the fourth gear set;

a first brake for holding the ring gear of the second gear set against rotation;

a second brake for holding the ring gear of the third gear set and the carrier of the fourth gear set against rotation; and a third brake for holding sun gear of the third gear set and the sun gear of the fourth gear set against rotation.

15. The transmission of claim 14, further comprising a one-way brake which restrains the ring gear of the second gear set against rotation in the negative direction while permitting rotation in the positive direction.

\* \* \* \* \*